United States Patent
Ooba

(10) Patent No.: US 8,587,282 B2
(45) Date of Patent: Nov. 19, 2013

(54) INTEGRATED CIRCUIT DEVICE FOR SWITCHING REGULATOR HAVING THE SAME CLOCK FREQUENCY AS THE SWITCHING FREQUENCY

(75) Inventor: Hiroyuki Ooba, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 255 days.

(21) Appl. No.: 13/137,702

(22) Filed: Sep. 6, 2011

(65) Prior Publication Data

US 2012/0056605 A1    Mar. 8, 2012

(30) Foreign Application Priority Data

Sep. 7, 2010 (JP) ................................. 2010-200306
May 12, 2011 (JP) ................................. 2011-107677

(51) Int. Cl.
  G05F 1/10    (2006.01)
  G05F 1/44    (2006.01)

(52) U.S. Cl.
  USPC ........... 323/283; 323/222; 323/223; 323/282; 323/284; 323/266

(58) Field of Classification Search
  USPC ................. 323/222, 223, 266, 282, 283, 284
  See application file for complete search history.

(56) References Cited

U.S. PATENT DOCUMENTS

| 7,075,278 | B2* | 7/2006 | Uematsu et al. | 323/282 |
| 7,084,613 | B2* | 8/2006 | Harris et al. | 323/272 |
| 2002/0135419 | A1* | 9/2002 | Groves et al. | 330/10 |
| 2003/0197245 | A1* | 10/2003 | Zhang | 257/531 |
| 2003/0206425 | A1* | 11/2003 | Zhang | 363/127 |
| 2004/0178783 | A1* | 9/2004 | Uematsu et al. | 323/282 |
| 2007/0291520 | A1* | 12/2007 | Schuellein | 363/65 |
| 2008/0089101 | A1* | 4/2008 | Schuellein | 363/65 |
| 2010/0020581 | A1* | 1/2010 | Mazzola et al. | 363/132 |

FOREIGN PATENT DOCUMENTS

| JP | 2001-111396 A | 4/2001 |
| JP | 2004-282961 A | 10/2004 |

* cited by examiner

*Primary Examiner* — Bao Q Vu
(74) *Attorney, Agent, or Firm* — McGinn IP Law Group, PLLC

(57) ABSTRACT

An integrated circuit device for a switching regulator, includes: a controller configured to generate a digital duty signal for a current mode control of the switching regulator based on an output voltage to be supplied from the switching regulator to a load circuit; and a switching pulse generating section configured to set a time ratio of a switching pulse signal for controlling turning-on and turning-off of a switching circuit which is provided in the switching regulator, based on the digital duty signal. The controller is a digital circuit which operates based on a master clock of the same frequency as a switching frequency of the switching circuit.

8 Claims, 15 Drawing Sheets

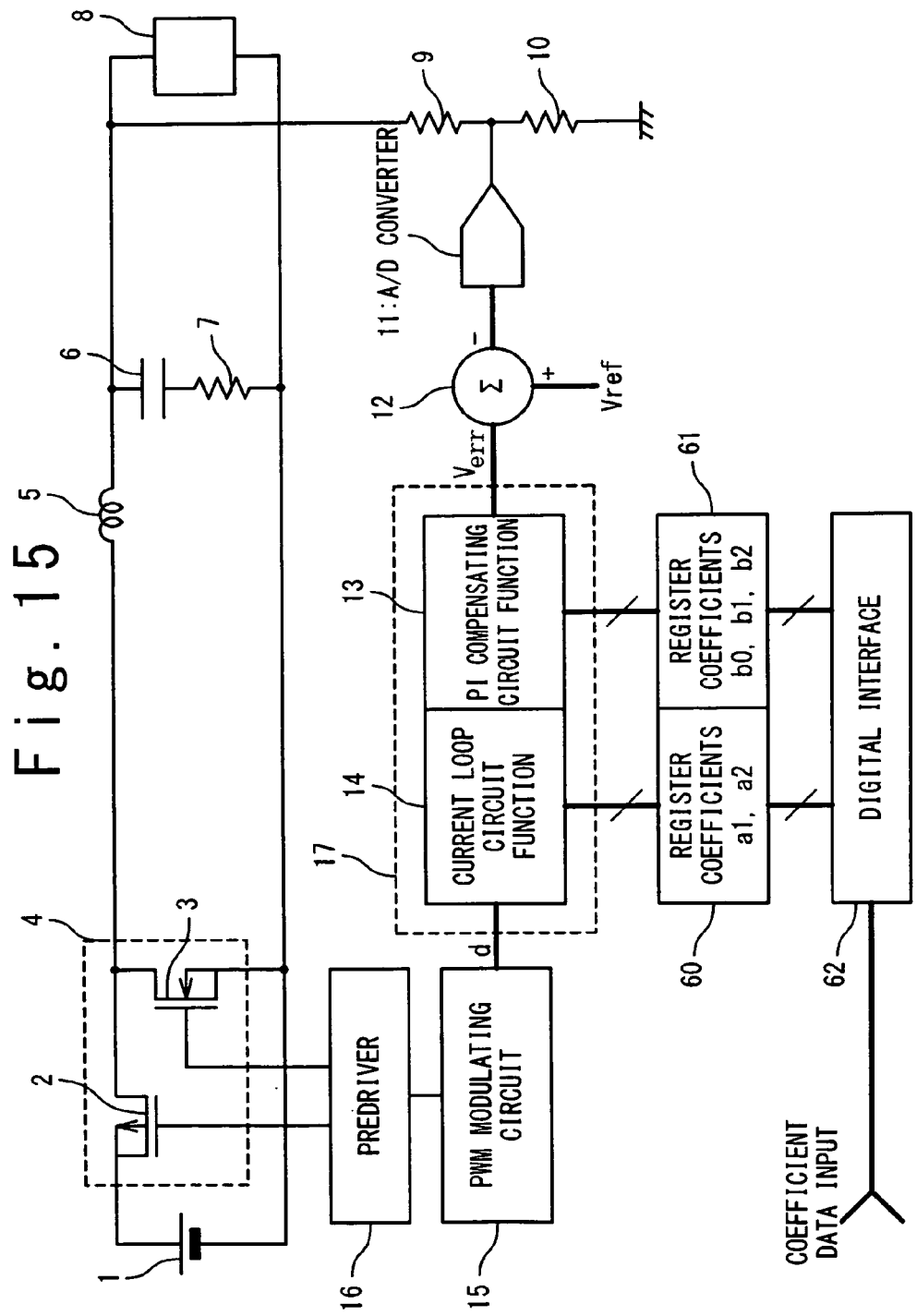

INTEGRATED CIRCUIT DEVICE FOR SWITCHING REGULATOR HAVING THE SAME CLOCK FREQUENCY AS THE SWITCHING FREQUENCY

CROSS-REFERENCE

This patent application claims priorities on convention based on Japanese Patent Application Nos. 2010-200306 and 2011-107677. The disclosures thereof are incorporated herein by reference.

TECHNICAL FIELD

The present invention is related to a switching regulator, especially, to a switching power supply IC which can be applied to the switching regulator and a designing method thereof.

BACKGROUND ARTS

In order to attain a stable operation of an apparatus mounted with ICs and a microcomputer, a direct current (DC) voltage is necessary which is stabilized to prevent any voltage drift. Recent years, in most of the electronic apparatuses, a switching regulator is adopted for supplying the stabilized DC voltage.

The switching regulator has features which are small in size and light in weight and functions as a DC-DC converter with good efficiency. Therefore, the switching regulator is widely used as a power supply for a microcomputer and a personal computer which are incorporated into various equipments. In these personal computers, a power consumption amount in a high-speed operation tends to increase. Also, the power consumption amount increases and decreases abruptly according to a processing load in the personal computer.

Also, in one feature, the switching regulator is possible to operate in a wide input voltage range. Therefore, the switching regulator is used as a power supply, which is operable in both of the area of 100V and the area of 200V in household voltage, and in which a specification range of input voltage is wide.

The switching regulator must stably control an output voltage to a target voltage according to change of the load of the personal computer. Moreover, in the switching regulator, even when the output voltage makes a transient response to a rapid change of load current and input voltage, it is required to quickly recover to the stable state of output voltage.

As methods of controlling the switching regulator, there are a voltage mode control and a current mode control. In the voltage mode control, switching is executed based on a pulse control signal generated through comparison of a triangle wave signal and an error control signal which is equivalent to a difference between the output voltage and a reference voltage, in order to stabilize output voltage. In the current mode control, the switching is executed based on an inductor current in addition to the error control signal, in order to further stabilize the output voltage.

In the voltage mode control, a phase margin must be secured at a point that the phase characteristic changes rapidly near a resonant frequency of an inductor and an output capacitor. Therefore, there is a problem that the power supply characteristic becomes unstable. On the other hand, in the current mode control, because a feedback circuit for controlling the inductor current and a current loop circuit which contains the inductor operate as an equivalent current source, the inductor characteristic does not have an influence on the power supply characteristic such as the frequency characteristic. As a result, the larger phase margin can be obtained in the current mode control, compared with the voltage mode control. Moreover, in the current mode control, from the above-mentioned reasons, it is possible to attain the current mode control in a wide bandwidth while maintaining the phase margin by extending a frequency band of the feedback circuit. Therefore, in the current mode control, the response characteristic to a load change can be improved compared with the voltage mode control.

A control system which executes the current mode control contains a voltage feedback system for stabilizing an output voltage and a current feedback system for controlling an inductor current. Therefore, it is necessary to provide the measure to restrain an influence by external noise and switching noise in each feedback system. Also, in the current feedback system of an analog circuit, a current detection resistance, an I-V converting circuit, and a slope compensation circuit need to be provided for the current mode control. Here, the current detection resistance and the I-V converting circuit are used to detect the inductor current. Therefore, the control system which executes the current mode control is larger in circuit scale than the control system which executes the voltage mode control, and it requires a complicated timing control. Therefore, in the switching regulator which realizes the current mode control, a peripheral circuit becomes large, and the number of parts on a printed circuit board and the mounting cost sometimes increase.

Moreover, a power loss by a current detection resistance becomes large to an unignorable extent as the output current of the switching regulator becomes large. As a technique to solve such a problem, a control unit for the switching power supply which can execute the current mode control without actually detecting the inductor current and a switching power supply are known (for example, refer to Patent Literature 1).

FIG. 1 is a circuit block diagram showing a configuration of the control unit for a switching power supply disclosed in Patent Literature 1. In the technique disclosed in Patent Literature 1, the current mode control is realized by the control unit for the switching power supply without detecting the inductor current. Referring to FIG. 1, the control unit for the switching power supply is provided with an analog-to-digital (A/D) converter 111 which A/D converts the output voltage Vo of the switching power supply, and a controller IC 118. The controller-IC 118 is provided with a difference circuit 112 which subtracts the output signal of the A/D converter 111 from a reference digital signal Vref and outputs an error signal, a gain circuit 170 which has a gain of the factor of G, a PWM signal generating section 128 which generates a PWM signal PS, and a feed-back circuit 129 which provides a current estimation function.

The PWM signal generating section 128 is provided with a voltage comparing circuit 124, an R-S flip-flop 127 and an AND circuit 172. A feed-back circuit 129 which provides the current estimation function is provided with an up and down counter 173, a low pass filter 174, a reset generating circuit 175 and a difference circuit 176. The difference circuit 176 subtracts the output signal DC of the low pass filter 174 from the output signal PC of the up and down counter 173.

In the control unit for the switching power supply disclosed in Patent Literature 1, a drive pulse PS is fed back to the current estimation function, and the inductor current in the switching power supply is estimated based on the drive pulse PS by using the current estimation function, to generate an estimated current signal PC. Moreover, in the control unit for the switching power supply disclosed in Patent Literature 1, by a DC component removal function, a DC component DC is extracted from the estimated current signal PC and the DC component DC is removed from the estimated current signal PC by the difference circuit 176.

The controller IC 118 is configured from a digital circuit operating with a master clock having the frequency of 10 MHz to 100 MHz and controls the switching power supply. The error signal as a difference between the A/D-converted digital output voltage Vo from the A/D converter 111 and the reference voltage Vref is amplified to the gain of G times according to P (proportion) control to generate a control signal CS.

Also, the PWM signal PS is negatively fed back and the estimated inductor current signal PC is generated by the feedback circuit 129.

FIG. 2 shows timing charts in the operation of the controller IC 118 disclosed in Patent Literature 1. The PWM signal PS is supplied to the up and down counter 173. The up and down counter 173 counts up according to the coefficient of "a" when the signal level of the PWM signal PS is H (High), and counts down according to the coefficient of "b" at the time of L (Low). These coefficients show increment/decrement rates of the inductor current. By the low pass filter 174 and the reset generating circuit 175, an error component (DC component) DC superimposed on the estimated inductor current signal PC is extracted and the estimated inductor current signal PC' is generated by correcting the error component DC.

Moreover, the control signal CS and the estimated inductor current signal PC' are compared by the voltage comparing circuit 124 and the PWM signal PS is generated based on the comparison result CO.

Patent Literature 2 discloses a digital PWM wave generating apparatus which makes the frequency of the PWM signal constant surely. The digital PWM wave generating apparatus is provided with a digital triangle wave generating section, a digital threshold value outputting section and a digital comparator. The digital triangle wave generating section outputs a digital triangle wave. The digital threshold value outputting section outputs a digital threshold value. The digital comparator compares the digital triangle wave and the digital threshold value and outputs the PWM signal. The time change rate of the digital threshold value when the digital threshold value outputting section changes the digital threshold value from a first constant value to a second constant value is set to a value equal to or smaller than a time change rate of the digital triangle wave.

Citation List

[Patent Literature 1]: JP 2004-282961A
[Patent Literature 2]: JP 2001-111396A

SUMMARY OF THE INVENTION

The number of bits of the PWM signal of the digital control switching regulator is determined from a relation of an input voltage and a voltage value of the least significant bit (LSB). In a voltage reducing type switching regulator, for example, in order to obtain the output voltage resolution of LSB=10 mV when the input voltage is 5 V, 9 bits (512 LSB) becomes necessary.

As shown in FIG. 2. in the technique described in Patent Literature 1, for example, in order to obtain the PWM signal PS of 9 bits, a master clock having the frequency of $2^9$ (=512) times of the switching frequency becomes necessary. That is, the up and down counter 173 must operate at high speed so as to generate the estimated inductor current signal PC.

In recent years, small-size and low-power-consumption of an electronic device and a high conversion efficiency of the power supply IC are requested. In the technique described in Patent Literature 1, when the switching frequency of the power supply IC increases, the frequency of the master clock becomes very high. Therefore, the power consumption value increases and sometimes power supply conversion efficiency is lowered.

One subject matter of the present invention is to provide an integrated circuit device for a digital control switching regulator and a designing method therefor, in which the increase of a power consumption value and the lowering of power supply conversion efficiency are restrained.

In an aspect of the present invention, an integrated circuit device for a switching regulator, includes: a controller configured to generate a digital duty signal for a current mode control of the switching regulator based on an output voltage to be supplied from the switching regulator to a load circuit; and a switching pulse generating section configured to set a time ratio of a switching pulse signal for controlling turning-on and turning-off of a switching circuit which is provided in the switching regulator, based on the digital duty signal. The controller is a digital circuit which operates based on a master clock of the same frequency as a switching frequency of the switching circuit.

In another aspect of the present invention, a designing method of an integrated circuit device for a switching regulator, is achieved by modeling an analog control switching regulator to determine a plurality of analog transfer functions; by determining a plurality of digital transfer functions through bilinear transformation from the plurality of analog transfer functions; by determining one from the plurality of digital transfer functions; and by designing a controller provided for the integrated circuit for a digital control switching regulator based on the determined digital transfer function. The integrated circuit further comprises a switching pulse generating section. The controller generates a digital duty signal for a current mode control of the digital control switching regulator based on an output voltage to be supplied from the digital control switching regulator to a load circuit. The switching pulse generating section sets a time ratio of a switching pulse signal for controlling turning-on and turning-off of a switching circuit which is provided in the digital control switching regulator, based on the digital duty signal. The controller is a digital circuit which operates based on a master clock of the same frequency as a switching frequency of the switching circuit.

According to the present invention, the integrated circuit device for the digital control switching regulator and the designing method therefore are provided, in which the increase of the power consumption value and the lowering of the power supply conversion efficiency are restrained.

BRIEF DESCRIPTION OF THE DRAWINGS

The above and other objects, advantages and features of the present invention will be more apparent from the following description of certain exemplary embodiments taken in conjunction with the accompanying drawings, in which:

FIG. 15 is a circuit block diagram of the digital current mode control switching regulator according to a fourth embodiment.

DESCRIPTION OF EMBODIMENTS

Hereinafter, an integrated circuit device for a switching regulator of the present invention and a designing method thereof will be described with reference to the attached drawings.

[First Embodiment]

Figure 3:
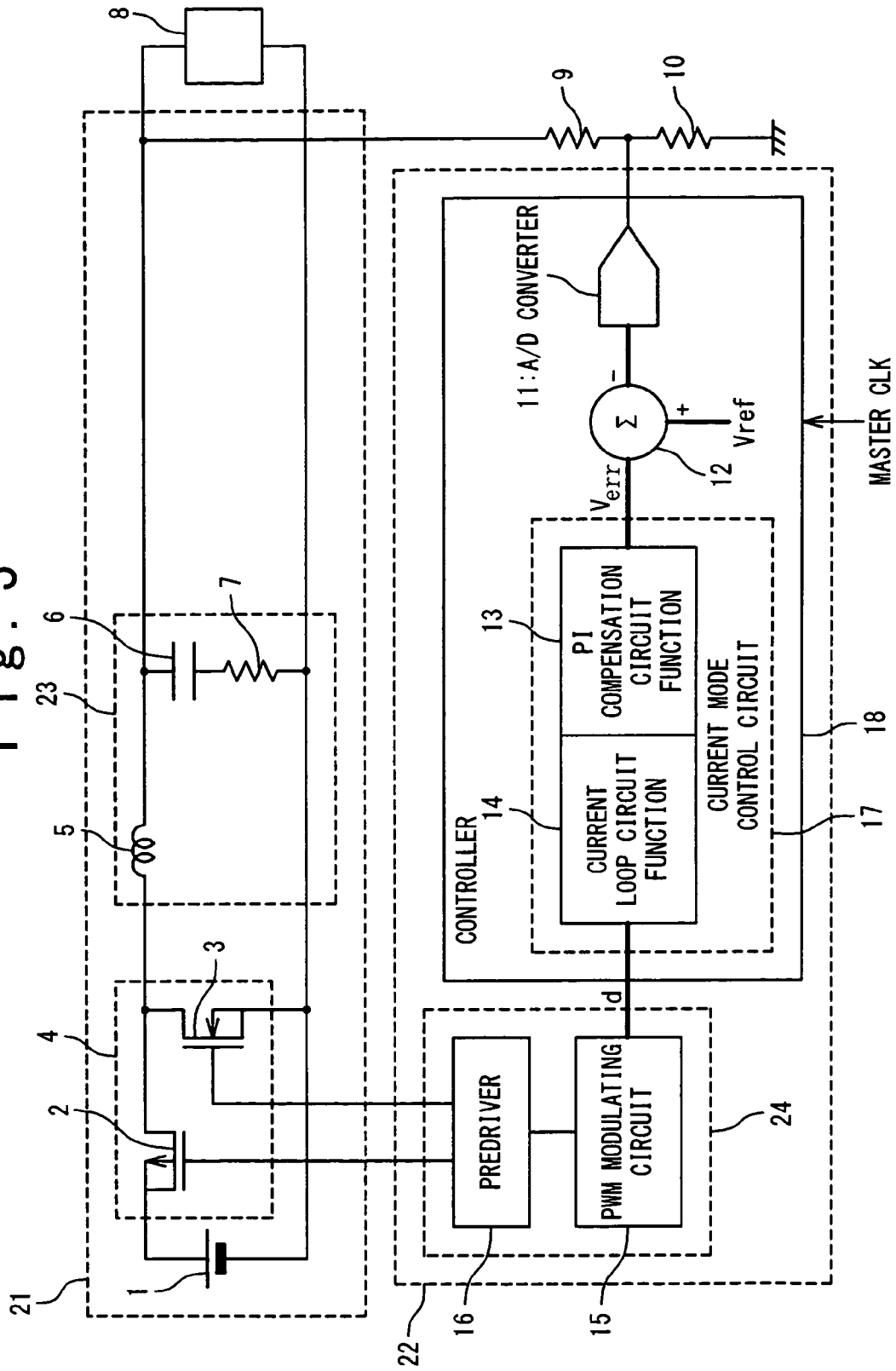
FIG. 3 is a block diagram showing a configuration of a digital current mode control switching regulator according to a first embodiment of the present invention.

Referring to FIG. 3, the switching regulator according to a first embodiment of the present invention is provided with a voltage generating section 21 and a switching pulse control section 22. The voltage generating section 21 generates and supplies an output voltage to a load circuit 8. The switching pulse control section 22 generates a switching pulse signal based on the output voltage and supplies it to the voltage generating section 21.

The voltage generating section 21 is provided with an input voltage source 1, a switching circuit 4 connected with the input voltage source 1, and a smoothing circuit 23 connected with the switching circuit 4 and the load circuit 8. The switching circuit 4 is provided with a high-side P-channel power MOS transistor 2 which receives the input voltage from the input voltage source 1, and a low-side N-channel power MOS transistor 3. The switching operations of the high-side P-channel power MOS transistor 2 and low-side N-channel power MOS transistor 3 are controlled based on the switching pulse signals supplied from the switching pulse control section 22.

The smoothing circuit 23 is provided between the switching circuit 4 and the load circuit 8. The smoothing circuit 23 is provided with an inductor 5, an output capacitor 6 and an equivalent internal resistance 7 of the output capacitor 6. The load circuit 8 contains a circuit which operates based on the voltage and current generated by the switching regulator according to the present embodiment.

The switching regulator according to the present embodiment is provided with a resistance 9 on the high-voltage side and a resistance 10 of the low-voltage side. The high-voltage side resistance 9 and the low-voltage side resistance 10 are connected with a wiring between the smoothing circuit 23 and the load circuit 8. The output voltage supplied from the switching regulator to the load circuit 8, i.e. the voltage between both ends of the load circuit 8 is supplied to the high-voltage side resistance 9 and the low-voltage side resistance 10. The switching pulse control section 22 is provided with a controller 18 supplied with an intermediate voltage between the high-voltage side resistance 9 and the low-voltage side resistance 10, and a switching pulse generating section 24. The intermediate voltage is a voltage corresponding to the output voltage supplied from the voltage generating section 21 to the load circuit 8. For example, the intermediate voltage is proportional to the output voltage. The controller 18 generates a digital duty signal d based on the intermediate voltage. The switching pulse generating section 24 is provided with a PWM modulating circuit 15 which outputs a PWM signal based on the digital duty signal d, and a predriver 16 which outputs a switching pulse signal based on the PWM signal. Here, the switching pulse generating section 24 sets a time ratio of the switching pulse signal, such as an ON time ratio per one period, based on the digital duty signal d. For example, the digital duty signal d specifies an ON time of the switching pulse signal. The controller 18 generates the digital duty signal d for the current mode control of the switching regulator according to the present embodiment.

Figure 1:
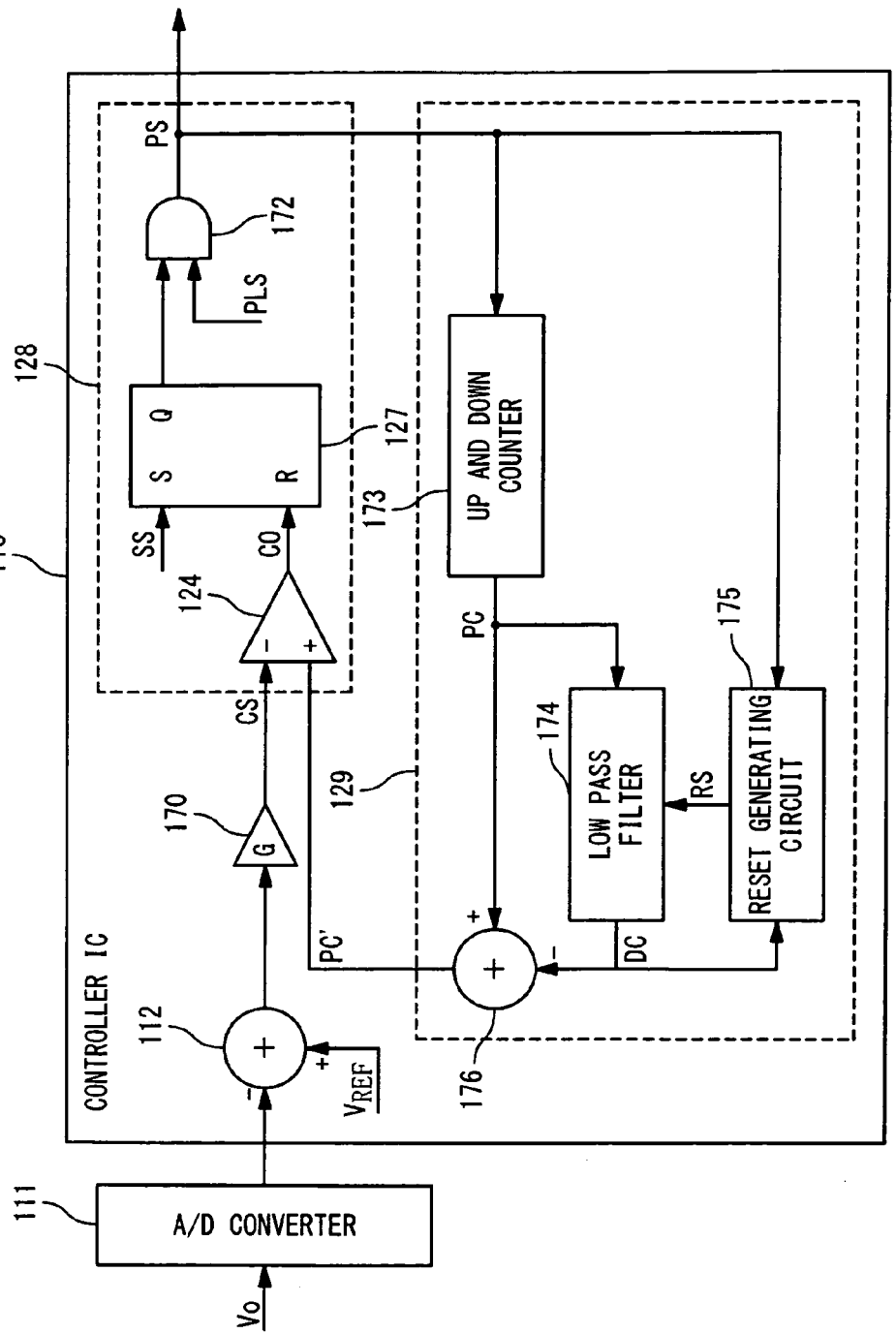
FIG. 1 is a block diagram showing a configuration of a conventional control unit for a switching power supply.
Figure 2:
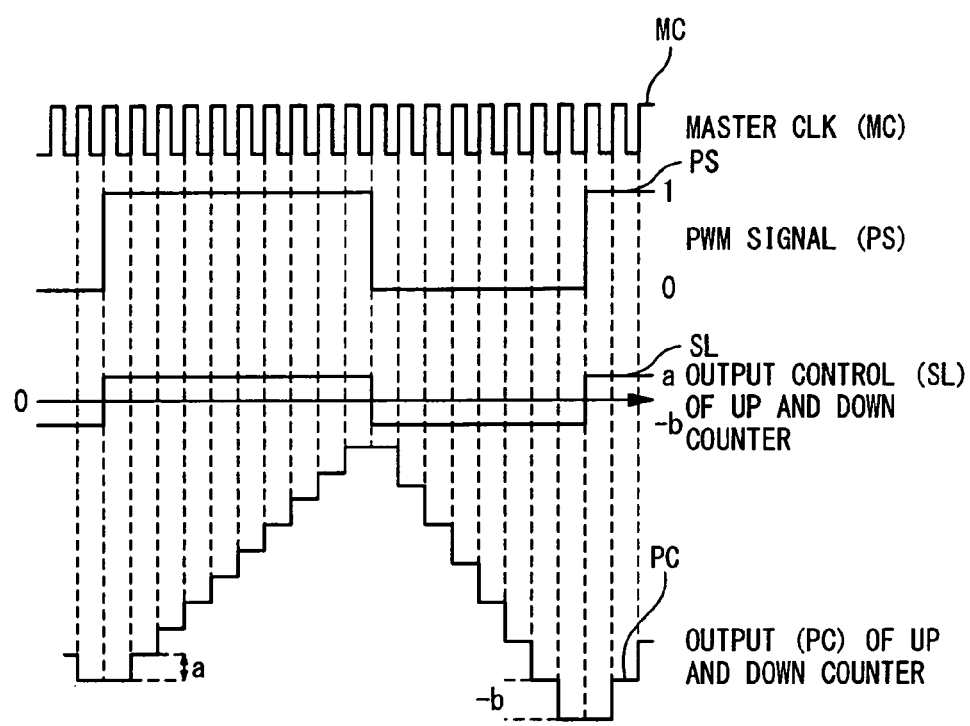
FIG. 2 shows timing charts in an operation of the conventional controller IC.

Here, the controller 18 is a digital circuit which operates with a master clock signal of the same frequency as a switching frequency of the switching circuit 4. On the other hand, the up and down counter 173 of the controller IC 118 shown in FIG. 1 operates with the master clock of a frequency which is higher than a frequency of the PWM signal PS, as shown in FIG. 2. Here, the frequency of the PWM signal PS is equal to the switching frequency. Therefore, the controller 18 operates with the master clock signal of the relatively low frequency. For this reason, the increase of a consumed power amount of the switching regulator according to the present embodiment and the lowering of power conversion efficiency are restrained.

It should be noted that the integrated circuit device for the switching regulator according to the present embodiment contains the switching pulse control section 22. The integrated circuit device for the switching regulator may contain the high-voltage side resistance 9 and the low-voltage side resistance 10 and may further contain the switching circuit 4.

In detail, the controller 18 is provided with an analog-to-digital (A/D) converter 11, a difference circuit 12 and a current mode control circuit 17. The A/D converter 11 generates a digital voltage signal showing the intermediate voltage through the A/D conversion. The digital voltage signal is sometimes called an intermediate voltage signal. Therefore, the digital voltage signal corresponds to the output voltage supplied to the load circuit 8 from the voltage generating section 21. The difference circuit 12 generates a digital error signal Verr from a reference digital signal Vref and the digital voltage signal. The digital error signal Verr is obtained by subtracting the intermediate voltage shown by the digital voltage signal from the reference voltage shown by the reference digital signal Vref. The current mode control circuit 17 generates the digital duty signal d for the current mode control of the switching regulator according to the present embodiment based on the digital error signal Verr. It should be noted that the current mode control circuit 17 has a PI compensation circuit function 13 and a current loop circuit function 14.

Figure 4:
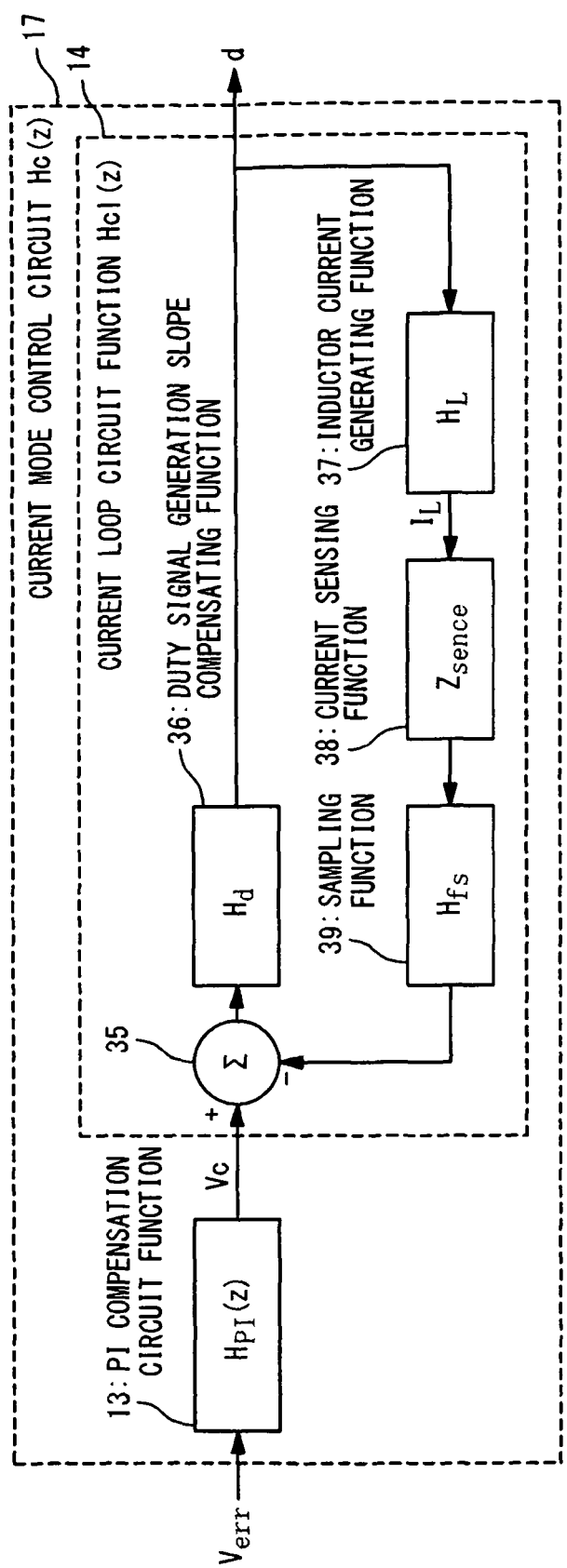
FIG. 4 is a block diagram showing the configuration of the current mode control circuit in the first embodiment.

Referring to FIG. 4, the PI compensation circuit function 13 performs phase compensation on the digital error signal Verr and generates a reference voltage control signal Vc. The current loop circuit function 14 is provided with a subtracting function 35, a duty signal generation slope compensating function 36, an inductor current generating function 37, a current sensing function 38 and a sampling function 39. The subtracting function 35 generates a differential signal by the subtracting the feedback signal outputted from sampling function 39 from the reference voltage signal Vc. The duty signal generation slope compensating function 36 generates the duty signal d based on the differential signal. The inductor current generating function 37 generates an inductor current $I_L$ as a current which flows through the inductor 5, based on the duty signal d. The current sensing function 38 senses or detects the inductor current $I_L$ and generates an output signal showing a detection result. The sampling function 39 outputs a feedback signal by sampling the output signal from the current sensing function 38 in the switching frequency of the switching circuit 4. Here, the current loop circuit function 14 estimates the inductor current $I_L$ as the current which flows through the inductor 5 through the calculation without detecting actually. The digital duty signal d is generated based on the estimated inductor current $I_L$ to realize the current mode control of the switching regulator according to the present embodiment.

Hereinafter, a designing method of the integrated circuit device for the switching regulator according to the present embodiment will be described.

Figure 5:
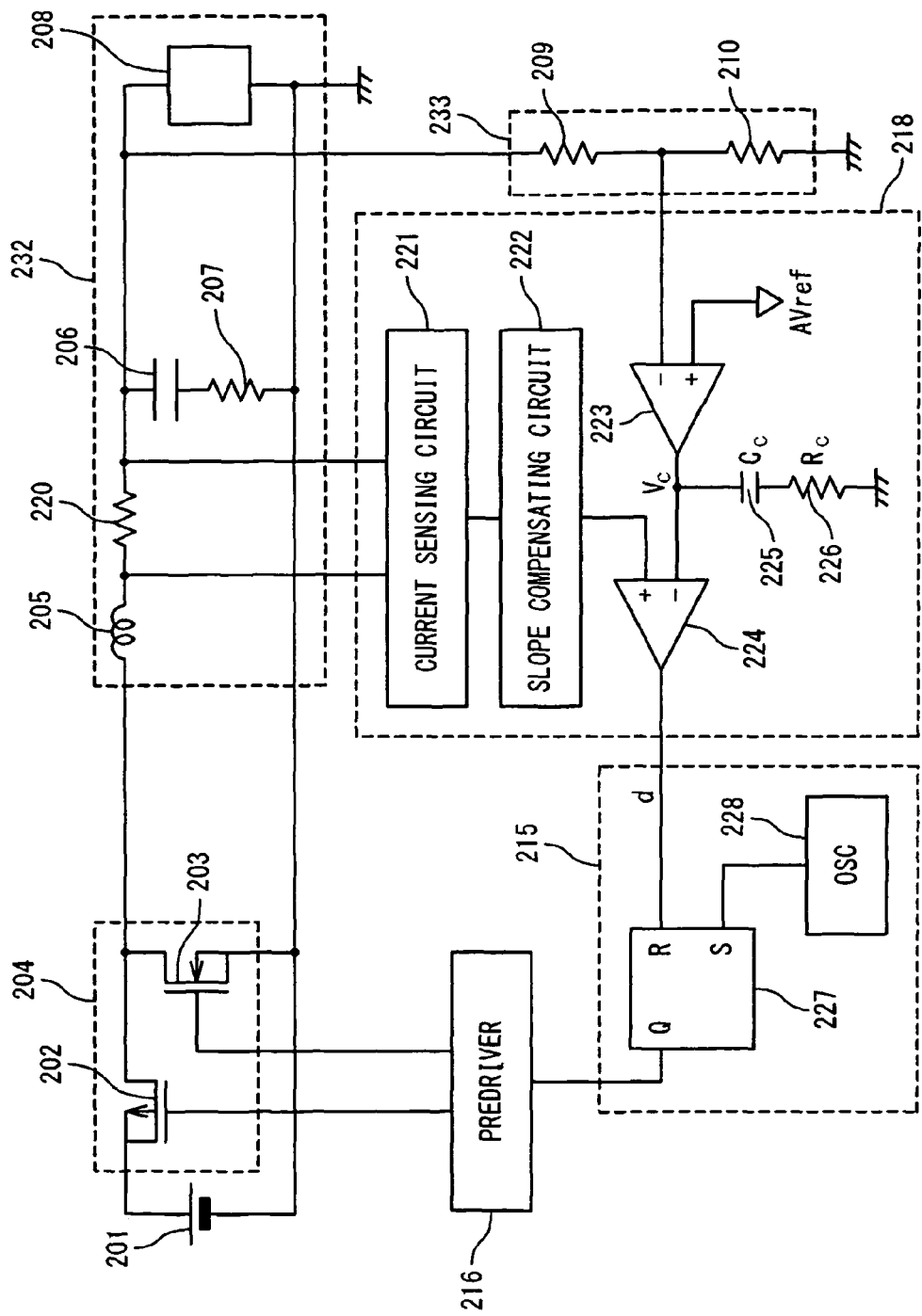
FIG. 5 is a block diagram showing an analog current mode control switching regulator.

FIG. 5 shows an analog control switching regulator as a prototype of the switching regulator according to the present embodiment. The analog control switching regulator realizes as analog control, the current mode control with the output voltage supplied to the load circuit 208. The integrated circuit device for the switching regulator according to the present embodiment is designed based on the analog control switching regulator.

The analog control switching regulator is provided with an input voltage source 201, a switching circuit 204, an inductor 205, an output capacitor 206, an equivalent internal resistance 207, a high-voltage side resistance 209, a low-voltage side resistance 210, a controller 218, a PWM modulating circuit 215 and a predriver 216. The switching circuit 204 is provided with a high-side P-channel power MOS transistor 202 and a low-side N-channel power MOS transistor 203. The load circuit 208 is connected with the analog control switching regulator. The input voltage source 201, the high-side P-channel power MOS transistor 202, the low-side N-channel power MOS transistor 203, the switching circuit 204, the inductor 205, the output capacitor 206, the equivalent internal resistance 207, the load circuit 208, the high-voltage side resistance 209, the low-voltage side resistance 210, the controller 218, the PWM modulating circuit 215, and the predriver 216 are equivalent to the input voltage source 1, the high-side P-channel power MOS transistor 2, the low-side N-channel power MOS transistor 3, the switching circuit 4, the inductor 5, the output capacitor 6, the equivalent internal resistance 7, the load circuit 8, the high-voltage side resistance 9, the low-voltage side resistance 10, the controller 18, the PWM modulating circuit 15, and the predriver 16, respectively.

The analog control switching regulator is provided with a current detection resistance 220 provided between the inductor 205 and the output capacitor 206. The controller 218 is provided with a current sensing circuit 221, a slope compensating circuit 222, an error amplifier 223 for the PI compensation, a voltage comparing circuit 224, a capacitor 225 for the PI compensation and a resistance 226 for the PI compensation. A capacitance of the capacitor 225 for the PI compensation and a resistance of the resistance 226 for the PI compensation are shown as Cc and Rc, respectively. The current sensing circuit 221 detects the inductor current as the current which flows through the inductor 205, by using the current detection resistance 220. The current sensing circuit 221 converts the inductor current into an analog voltage signal and outputs it to the slope compensating circuit 222. The slope compensating circuit 222 performs slope compensation on the analog voltage signal and generates a slope compensation resultant signal. The slope compensating circuit 222 outputs the slope compensation resultant signal to the voltage comparing circuit 224. The intermediate voltage between the high-voltage side resistance 209 and the low-voltage side resistance 210 is supplied to the error amplifier 223 for the PI compensation. The circuit which is composed of the error amplifier 223 for the PI compensation, the capacitor 225 and the resistance 226, outputs a reference voltage control signal Vc based on the intermediate voltage and the reference analog signal AVref. Here, the capacitor 225 and the resistance 226 determine a phase compensation quantity of the reference voltage control signal Vc. The voltage comparing circuit 224 outputs the duty signal d as a binary signal based on the comparison result between the slope compensation resultant signal from the slope compensating circuit 222 and the reference voltage control signal Vc.

The PWM modulating circuit 215 is provided with an R-S flip-flop 227 and a reference oscillator 228. The R-S flip-flop 227 outputs the PWM signal to the predriver 216 based on the duty signal d. The reference oscillator 228 determines the frequency of the PWM signal.

Figure 6:
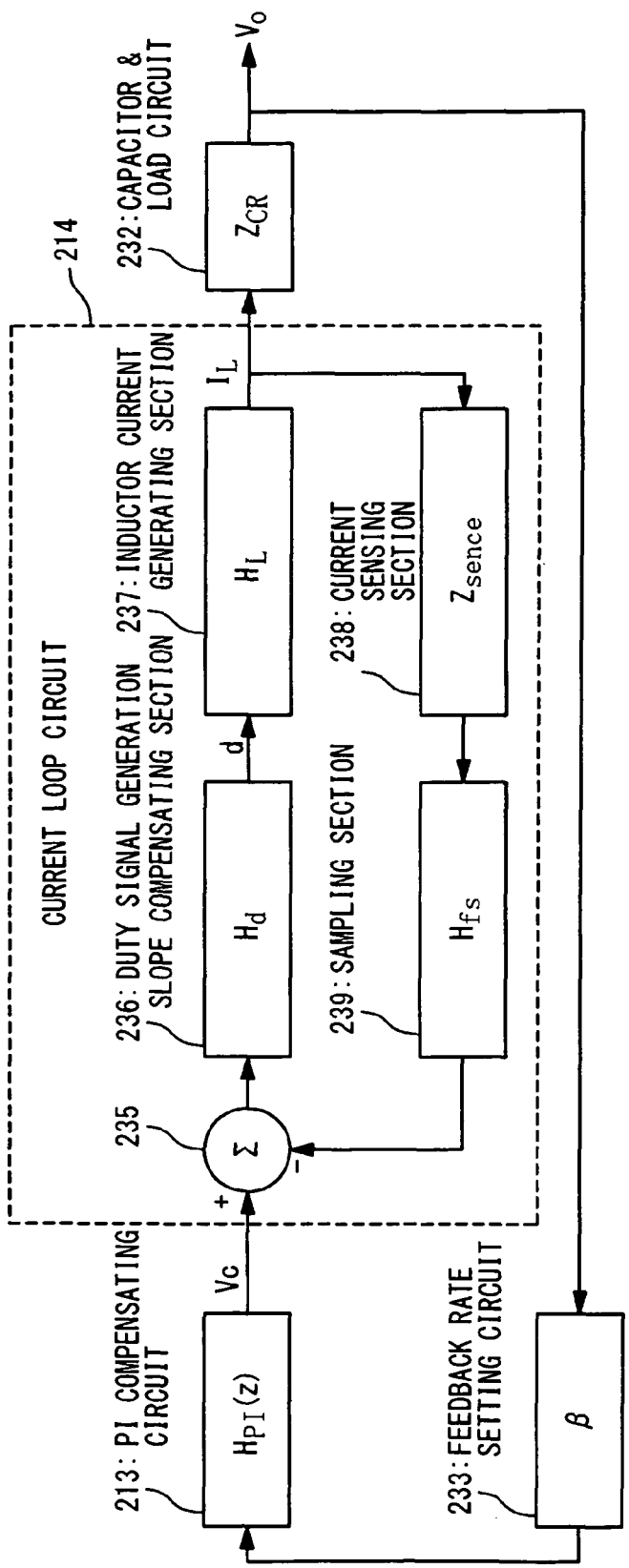
FIG. 6 is a block diagram showing the configuration of a circuit block of the analog current mode control switching regulator.

FIG. 6 shows a circuit in which the components of the analog control switching regulator shown in FIG. 5 are replaced by circuit blocks. The circuit is provided with a PI compensating circuit 213, a current loop circuit 214, and a capacitor and load circuit 232, and a feedback rate setting circuit 233. The PI compensating circuit 213 corresponds to the circuit which is composed of the error amplifier 223 for the PI compensation, the capacitor 225 for the PI compensation and the resistance 226 for the PI compensation. The capacitor and load circuit 232 corresponds to the circuit which is composed of the inductor 205, the output capacitor 206, the equivalent internal resistance 207 and the load circuit 208. The feedback rate setting circuit 233 corresponds to the circuit which is composed of the high-voltage side resistance 209 and the low-voltage side resistance 210.

A loop circuit which is composed of the PI compensating circuit 213, the current loop circuit 214, the capacitor and load circuit 232 and the feedback rate setting circuit 233 corresponds to the voltage loop circuit of the analog control switching regulator. The PI compensating circuit 213 outputs the reference voltage control signal Vc based on the intermediate voltage which is outputted from the feedback rate setting circuit 233 and is between the high-voltage side resistance 209 and the low-voltage side resistance 210. The current loop circuit 214 outputs the inductor current $I_L$ as the current which flows through the inductor 205, based on the reference voltage control signal Vc. The capacitor and load circuit 232 outputs the output voltage Vo which is supplied to the load circuit 208. The feedback rate setting circuit 233 outputs the intermediate voltage between the high-voltage side resistance 209 and the low-voltage side resistance 210 based on the output voltage Vo.

The current loop circuit 214 is provided with a loop circuit which is composed of a subtractor 235, a duty signal generation slope compensating section 236, an inductor current generating section 237, a current sensing section 238 and a sampling section 239. The current loop circuit 214 corresponds to a current loop of the analog control switching regulator. The current loop contains the current sensing circuit 221 and the slope compensating circuit 222. The subtractor 235 subtracts the feedback signal outputted from the sampling section 239 from the reference voltage signal Vc and generates a differential signal. The duty signal generation slope compensating section 236 generates the duty signal d based on the differential signal. The inductor current generating section 237 generates inductor current $I_L$ based on the duty signal d. The current sensing section 238 detects the inductor current $I_L$ and generates the output signal showing a detection result. The sampling section 239 samples the output signal of the current sensing section 238 with the switching frequency of the switching circuit 204 and outputs the above-mentioned feedback signal.

Here, the PI compensating circuit 213 and the current loop circuit 214 correspond to the PI compensation circuit function 13 and the current loop circuit function 14, respectively. The subtractor 235, the duty signal generation slope compensating section 236, the inductor current generating section 237, the current sensing section 238 and the sampling section 239 correspond to the subtracting function 35, the duty signal generation slope compensating function 36, the inductor current generating function 37, the current sensing function 38 and the sampling function 39, respectively.

Next, a method of determining a transfer function showing the current mode control circuit 17 of the switching regulator according to the present embodiment will be described.

The transfer function $H_{PI}(s)$ showing the PI compensating circuit 213 is shown by an s conversion equation as expressed in the following equation (1):

$$H_{PI}(s) = gm \cdot Rc\left(\frac{1 + sCcRc}{sCcRc}\right) = K\left(\frac{1 + sCcRc}{sCcRc}\right) = K\left(\frac{1 + \alpha \cdot s}{\alpha \cdot s}\right) \quad (1)$$

$$\alpha = CcRc = \frac{1}{2\pi f_c}$$

By performing bilinear transformation (transformation from s-plane into z-plane) based on the following equation (2), the transfer function $H_{PI}(z)$ is obtained from a transfer function $H_{PI}(s)$:

$$s = \frac{2}{T_s}\frac{1 - z^{-1}}{1 + z^{-1}} \quad (2)$$

$$T_s = \frac{1}{f_s} \quad f_s: \text{switchng frequency}$$

The following equation (3) shows the transfer function $H_{PI}(z)$. The transfer function $H_{PI}(z)$ shows the PI compensation circuit function 13 of the current mode control circuit 17:

$$H_{PI}(z) = K\left(\frac{1 + \frac{2\alpha}{T_s}\frac{1 - z^{-1}}{1 + z^{-1}}}{\frac{2\alpha}{T_s}\frac{1 - z^{-1}}{1 + z^{-1}}}\right) \quad (3)$$

$$= K\left(\frac{\frac{T_s + 2\alpha}{2\alpha} + \frac{T_s - 2\alpha}{2\alpha}z^{-1}}{1 - z^{-1}}\right)$$

$$= K\left(\frac{b_0^* + b_2^* \cdot z^{-1}}{1 - z^{-1}}\right)$$

$$b_0^* = \frac{T_s + 2\alpha}{2\alpha} \quad b_2^* = \frac{T_s - 2\alpha}{2\alpha}$$

A transfer function $H_{cl}(s)$ showing the current loop circuit 214 is shown by an s conversion equation as expressed in the following equation (4):

$$H_{cl}(s) = \frac{sL}{\left(1 + \frac{2s}{\varpi_n}\rho + \frac{s^2}{\varpi_n^2}\right)Z_{sence} \cdot V_{in}} \quad (4)$$

$$\rho = \frac{\pi}{2}\left(\frac{1}{2} + \frac{L \cdot mc}{V_{in} \cdot Z_{sence}} - \frac{V_{out}}{V_{in}}\right)$$

$$\varpi_n = \pi f_s$$

ms: slope compensation coefficient

By performing bilinear transformation (transformation from s-plane into z-plane) based on the above-mentioned equation (2), the transfer function $H_{cl}(z)$ is obtained from the transfer function $H_{cl}(s)$. The following equation (5) shows the transfer function $H_{cl}(z)$. The transfer function $H_{cl}(z)$ shows the current loop circuit function 14 of the current mode control circuit 17:

$$H_{cl}(z) = \frac{\frac{2\beta}{T_s}(1 - z^{-2})}{\left(\left(1 + \frac{4\rho}{\pi} + \frac{4}{\pi^2}\right) + \left(2 - \frac{8}{\pi^2}\right)z^{-1} + \left(1 - \frac{4\rho}{\pi} + \frac{4}{\pi^2}\right)z^{-2}\right)Z_{sence}} \quad (5)$$

$$= \frac{2\beta f_s}{Z_{sence}} \frac{1 - z^{-2}}{(1.405 + 1.273\rho) + 1.189z^{-1} + (1.405 - 1.273\rho)z^{-2}}$$

$$\beta = \frac{L}{V_m} \quad T_s = \frac{1}{f_s}$$

The transfer function $H_c(z)$ of the current mode control circuit 17 can be determined as the following equation (6) based on the above-mentioned equation (3) and the equation (5):

$$H_C(z) = H_{PI}(z) \cdot H_{cl}(z) = \frac{2\beta f_s K}{Z_{sence}} \frac{b_0^* + b_2^* z^{-1}}{1 - z^{-1}} \quad (6)$$

$$\frac{1 - z^{-2}}{(1.405 + 1.273\rho) + 1.189z^{-1} + (1.405 - 1.273\rho)z^{-2}} =$$

$$k^* \frac{b_0^* + 2z^{-1} - b_2^* z^{-2}}{(1.405 + 1.273\rho) + 1.189z^{-1} + (1.405 - 1.273\rho)z^{-2}}$$

The transfer function $H_c(z)$ of the current mode control circuit 17 shown in the equation (6) can be converted into a transfer function of a general IIR (Infinite Impulse Resonance) digital filter circuit. When converting the equation (6) into the transfer function of the IIR digital filter circuit, it is shown by the following equation (7):

$$H_C(z) = k \times \left(\frac{b_0 + b_1 \cdot z^{-1} + b_2 \cdot z^{-2}}{a_0 - a_1 \cdot z^{-1} - a_2 \cdot z^{-2}}\right) \quad (7)$$

$$b_0 = b_0^* = \frac{T_s + 2\alpha}{2\alpha}$$

$$b_1 = 2$$

$$b_2 = b_2^* = \frac{T_s - 2\alpha}{2\alpha}$$

$$k = \frac{2\beta f_s K}{Z_{sence}(1.405 + 1.273\rho)}$$

$$a_0 = 1$$

-continued $$a_1 = -\frac{1.189}{(1.405 + 1.273\rho)}$$

$$a_2 = \frac{(1.405 - 1.273\rho)}{(1.405 + 1.273\rho)}$$

Therefore, if calculating predetermined coefficients based on the equation (7), the IIR digital filter circuit can be used as the current mode control circuit 17. Therefore, the current mode control circuit 17 can be easily realized.

As mentioned above, by developing the transfer function obtained by modeling the analog control switching regulator shown in FIG. 5, the transfer function $H_c(z)$ of the current mode control circuit 17 is obtained. Therefore, the circuit parameters of the analog control switching regulator such as an input voltage value, an output voltage value, an output load current value, a switching frequency, an inductor value (an inductance), a capacitance value of an output capacitor and a PI compensation value are prepared, so that the coefficients of the digital filter circuit as the current mode control circuit 17 can be easily calculated. The PI compensation value contains the amplification factor gm of an error amplifier 223, the capacitance value Cc of the capacitor 225, and the resistance value Rc of the resistance 226. The amplification factor gm, the capacitance value Cc and the resistance value Rc are the parameters in the equation (1).

Therefore, the coefficients of the digital filter circuit are calculated by using the equation (7), and an integrated circuit device for the switching regulator according to the present embodiment can be designed by using the calculated coefficients. Moreover, if they are set once at the design stage, the coefficients $a_1$, $a_2$, $b_0$, $b_1$, and $b_2$ in the equation (6) are not required to be changed in the ordinary operation. Therefore, the configuration of a multiplication circuit contained in the digital filter circuit is simple.

According to the present embodiment, by paying attention to the current loop of the analog control switching regulator when modeling the analog control switching regulator, the function to execute the current mode control of the switching regulator by estimating an inductor current can be realized by a simple digital circuit.

Figure 7:
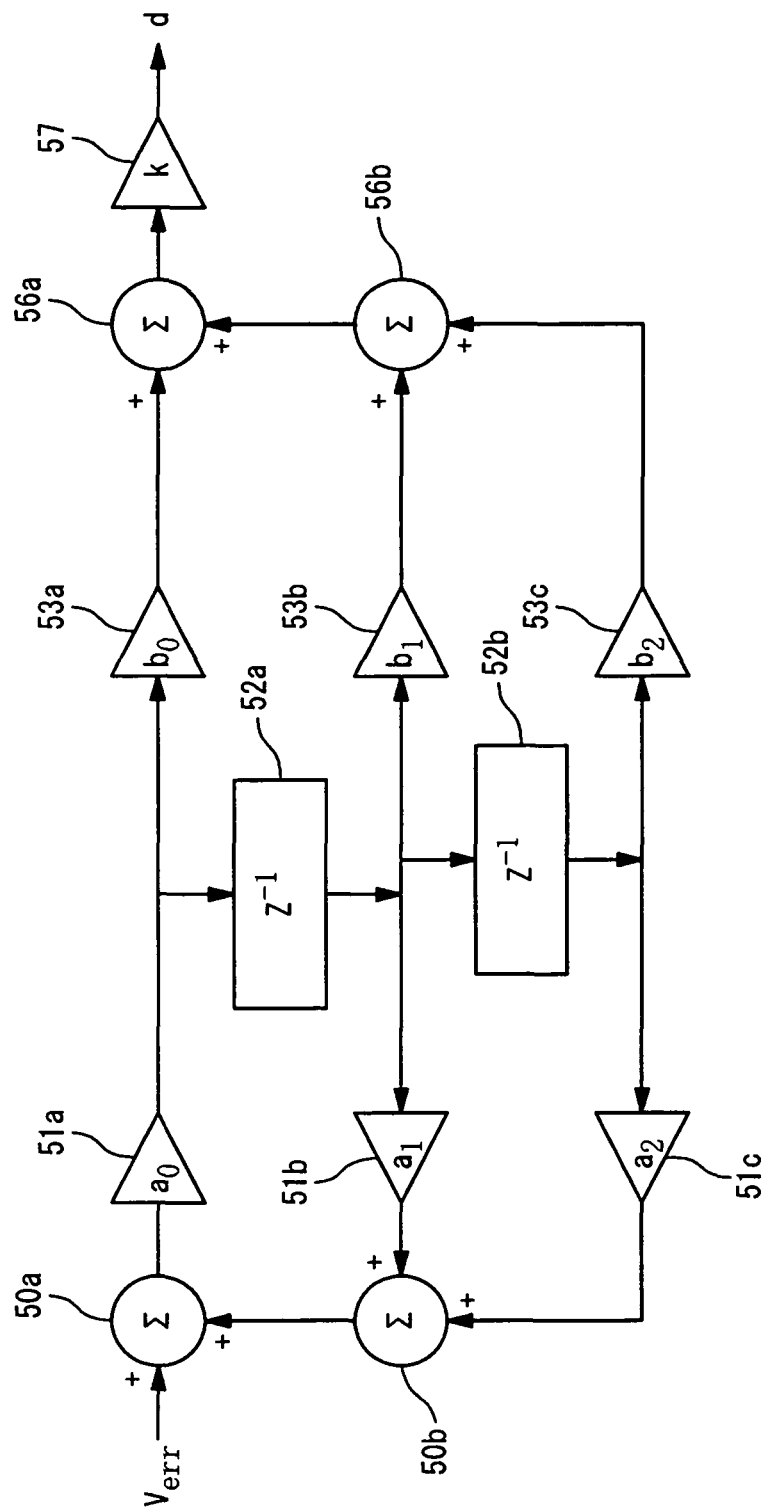
FIG. 7 is a block diagram showing an equivalent circuit with a transfer function Hc(z) of a current mode control circuit.

FIG. 7 shows a digital circuit corresponding to the transfer function $H_c(z)$ of the current mode control circuit 17. As shown in FIG. 7, the current mode control circuit 17 is provided with an adder 50a, an adder 50b, a multiplier 51a, a multiplier 51b, a multiplier 51c, a delay circuit 52a, a delay circuit 52b, a multiplier 53a, a multiplier 53b, a multiplier 53c, an adder 56a, an adder 56b and a multiplier 57. The adder 50a outputs an addition result of the error signal Verr and an output of the adder 50b. The multiplier 51a outputs a multiplication result of the coefficient a0 of the digital filter circuit and the output of the adder 50a. The delay circuit 52a outputs a delay result which is obtained by delaying the output of the multiplier 51a for one clock. The delay circuit 52b outputs a delay result which is obtained by delaying the output of the delay circuit 52a for one clock. The multiplier 51b outputs to the adder 50b, a multiplication result of the coefficient $a_1$ of the digital filter circuit and the output of the delay circuit 52a. The multiplier 51c outputs to the adder 50b, a multiplication result of the coefficient $a_2$ of the digital filter circuit and the output of the delay circuit 52b. The adder 50b outputs to the adder 50a, an addition result of the output of the multiplier 51b and the output of the multiplier 51c. The multiplier 53a outputs a multiplication result of the coefficient $b_0$ of the digital filter circuit and the output of the multiplier 51a. The multiplier 53b outputs a multiplication result of the coefficient $b_1$ of the digital filter circuit and the output of the delay circuit 52a. The multiplier 53c outputs a multiplication result of the coefficient $b_2$ of the digital filter circuit and the output of the delay circuit 52b. The adder 56b outputs an addition result of the output of the multiplier 53b and the output of the multiplier 53c. The adder 56a outputs an addition result of the output of the multiplier 53a and the output of the adder 56b. The multiplier 57 outputs a multiplication result of the output of the adder 56a by a multiplication coefficient k as the duty signal d. Referring to the equation (7), the digital circuit shown in FIG. 7 can be more simplified.

Figure 8:
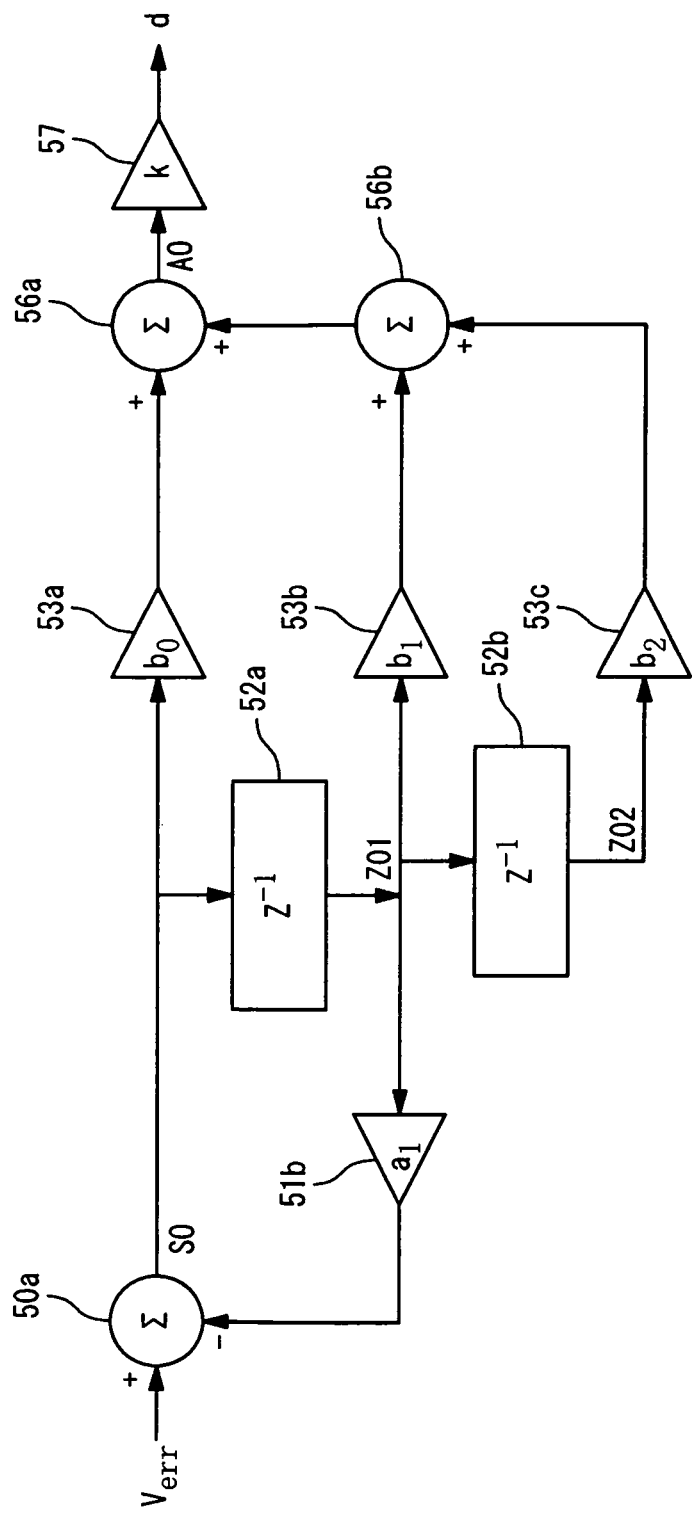
FIG. 8 is a block diagram showing the configuration of a current mode control circuit.

FIG. 8 shows another digital circuit corresponding to the transfer function $H_c(z)$ of the current mode control circuit 17. When configuring the IIR digital filter circuit having the coefficients shown in the equation (7) with a semiconductor integrated circuit, there is a case that the coefficient $a_2$ is small to ignorable extent. In such a case, the multiplier 51c of FIG. 7 can be omitted. As a result, the adder 50b, too, can be omitted. The digital circuit of FIG. 8 is an example showing a configuration simplified by omitting the multiplier 51c and the adder 50b from the digital circuit of FIG. 7. As shown in FIG. 8, the current mode control circuit 17 is provided with the adder 50a, the multiplier 51b, the delay circuit 52a, the delay circuit 52b, the multiplier 53a, the multiplier 53b, the multiplier 53c, the adder 56a, the adder 56b and the multiplier 57. The coefficient $a_1$ in the equation (7) is given to the adder 50a, but because the coefficient $a_1$ is a negative value, the input of the adder 50a is shown with a minus sign, for easy understanding in FIG. 8. The adder 50a subtracts the output of the multiplier 51b from the error signal Verr and outputs a first internal signal S0. The first internal signal S0 corresponds to internal data of the digital filter circuit (the current mode control circuit 17). The delay circuit 52a delays the first internal signal S0 for one clock and outputs a first delay signal ZO1. The multiplier 51b outputs a multiplication result of the coefficient $a_1$ of the digital filter circuit and the first delay signal ZO1 to the adder 50a. The delay circuit 52b delays the first delay signal ZO1 for one clock and outputs a second delay signal ZO2. The multiplier 53a outputs a multiplication result of the coefficient $b_0$ of the digital filter circuit and the first internal signal SO. The multiplier 53b outputs the multiplication result of the coefficient $b_1$ of the digital filter circuit and the first delay signal ZO1. The multiplier 53c outputs the multiplication result of the coefficient $b_2$ of the digital filter circuit and a second delay signal ZO2. The adder 56b outputs an addition result of the output of the multiplier 53b and the output of the multiplier 53c. The adder 56a outputs a second internal signal AO as an addition result of the output of the multiplier 53a and the output of the adder 56b. The multiplier 57 multiplies the output the adder 56a by the coefficient k, to output as the duty signal d.

Figure 9:
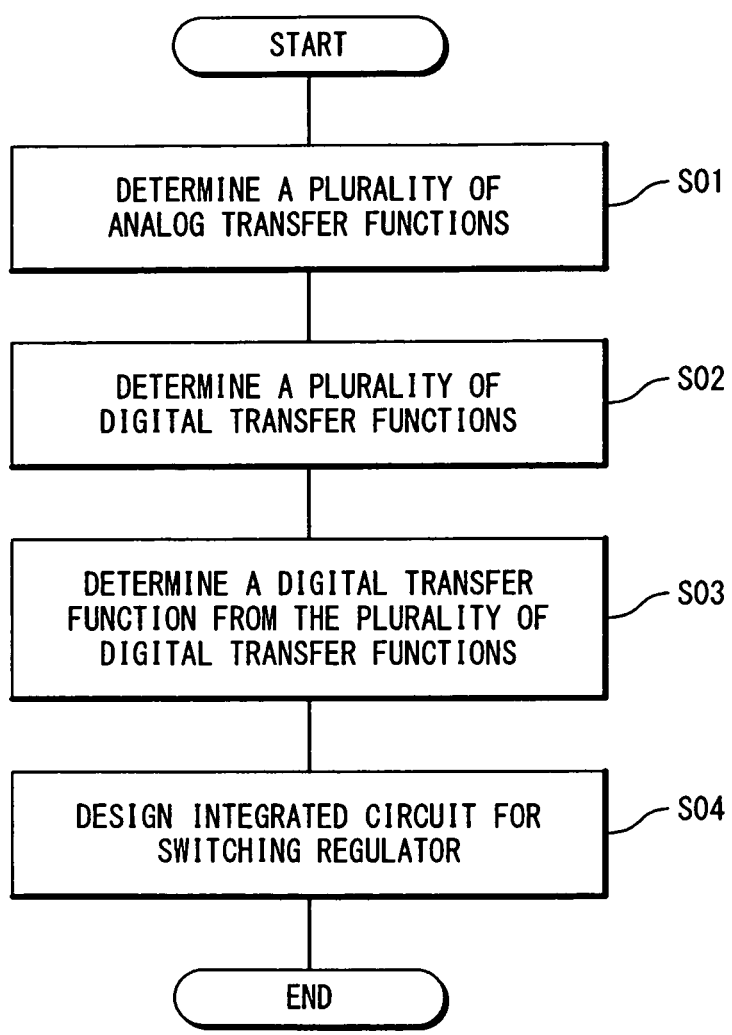
FIG. 9 is a flow chart of a method of designing the integrated circuit device for the switching regulator according to the first embodiment.

A design method of the integrated circuit device for the switching regulator according to the present embodiment can be summarized as follows. Referring to FIG. 9, the design method of the integrated circuit device for the switching regulator is provided with step S01 to step S04. At step S01, by modeling the analog control switching regulator, a plurality of analog transfer functions $H_{Pt}(s)$ and $H_{ct}(s)$ are determined. At step S02, a plurality of digital transfer functions $H_{Pt}(z)$ and $H_{ct}(z)$ are determined through bilinear transformation from the plurality of analog transfer functions $H_{Pt}(s)$ and $H_{ct}(s)$. At step S03, the digital transfer function $H_c(z)$ is determined from the plurality of digital transfer functions $H_{Pt}(z)$ and $H_{ct}(z)$. At step S04, the integrated circuit device for the switching regulator according to the present embodiment is designed based on the digital transfer function $H_c(z)$. At step S04, specifically, the controller 18 is designed, and more specifically, the current mode control circuit 17 is designed. Here, it is important that the plurality of analog transfer functions $H_{Pf}(s)$ and $H_{cf}(s)$ contain the analog transfer function $H_{ct}(s)$ corresponding to the current loop of the analog control switching regulator.

Figure 10:
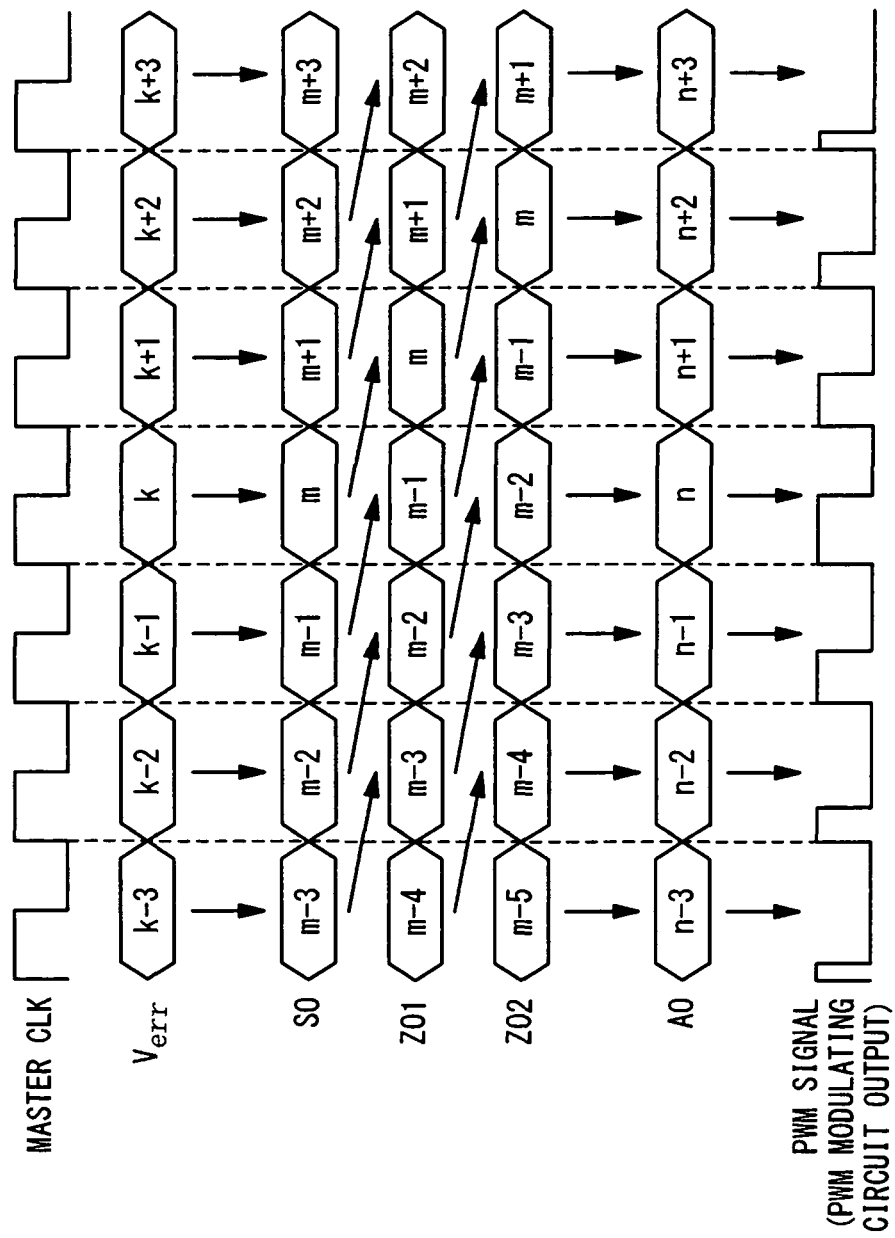
FIG. 10 shows timing charts showing an operation of the controller according to the first embodiment.

FIG. 10 shows timing charts in the operation of the controller 18 according to the present embodiment. Referring to FIG. 10, the error signal Verr and the internal signal of the current mode control circuit 17 (the first internal signal SO, the first delay signal ZO1, the second delay signal ZO2 and the second internal signal AO) are synchronized with a master clock of the same frequency as the switching frequency. From this, it is confirmed that the controller 18 operates with the master clock of the same frequency as the switching frequency of the switching circuit 4.

Figure 11:
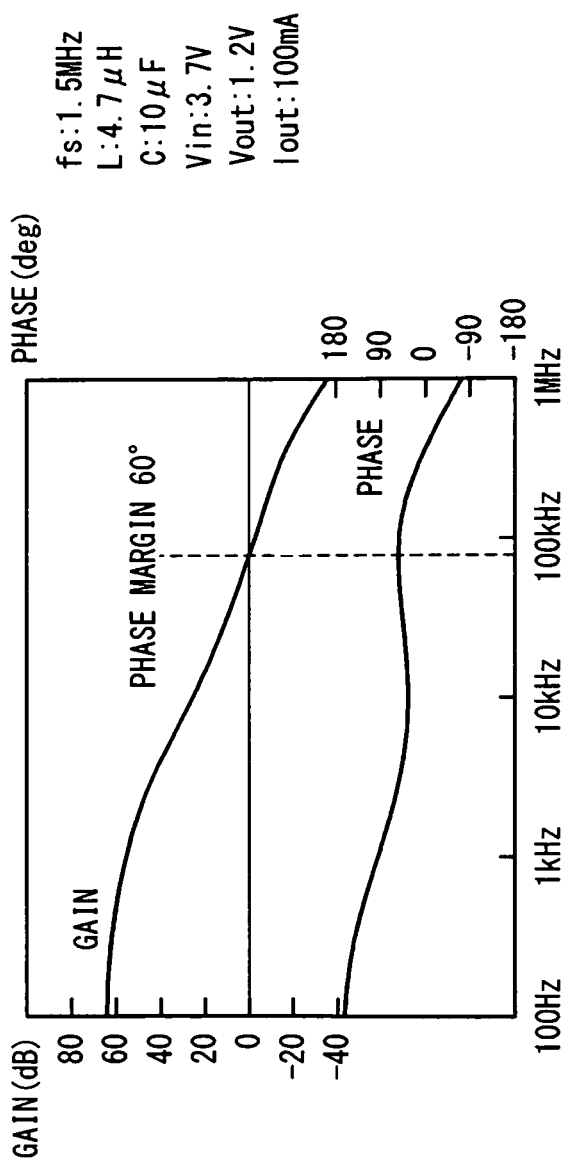
FIG. 11 is a block diagram showing a frequency characteristic of an analog current mode control switching regulator.

FIG. 11 shows a frequency characteristic measured in the above-mentioned analog control switching regulator. The frequency characteristic of FIG. 11 contains a frequency—gain characteristic, and a frequency—phase characteristic. The frequency characteristic of FIG. 11 was obtained in case that the circuit parameters were as follows:
input voltage Vin=3.7 V,
output voltage Vout=1.2 V,
output load current value Iout=100 mA,
switching frequency $f_s$=1.5 MHz,
inductor value L=4.7·H, and
output capacitor capacity value C=10·F.

Figure 12:
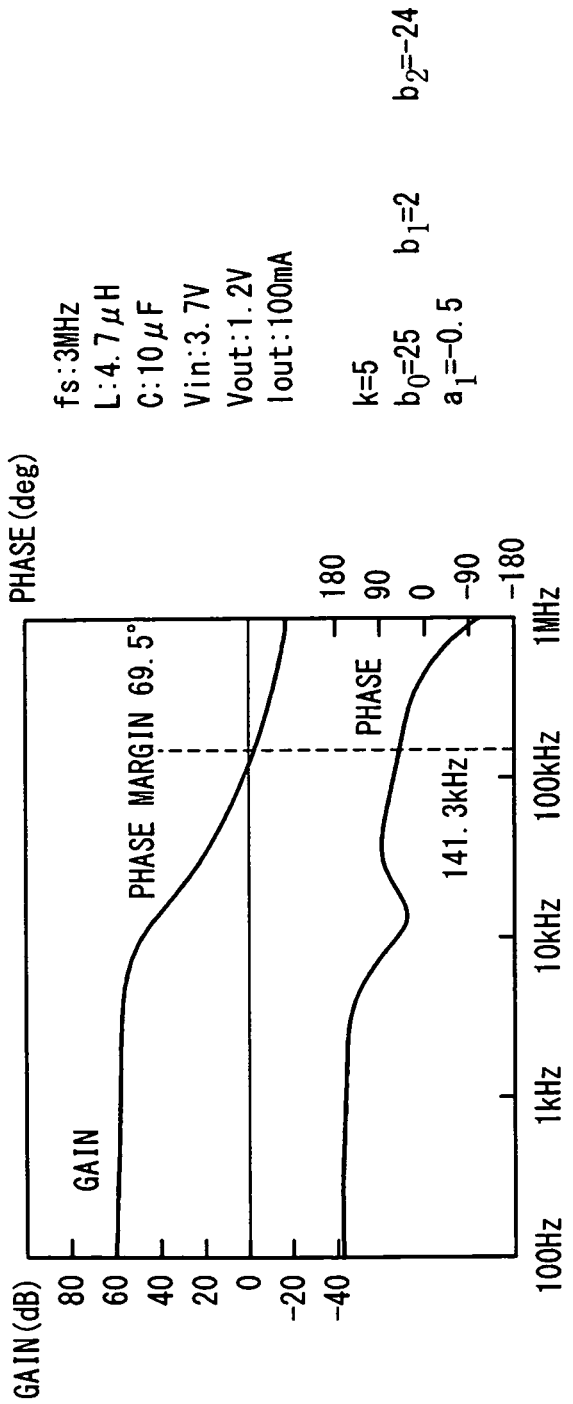
FIG. 12 is a graph showing a frequency characteristic of the switching regulator according to the first embodiment.

FIG. 12 shows the frequency characteristic measured in the switching regulator according to the present embodiment. The frequency characteristic of FIG. 12 contains a frequency—gain characteristic, and a frequency—phase characteristic. The frequency characteristic of FIG. 12 was obtained in case that the circuit parameters were as follows:
input voltage Vin=3.7 V,
output voltage Vout=1.2 V,
output load current value Iout=100 mA,
switching frequency $f_s$=3.0 MHz,
inductor value L=4.7·H,
output capacitor capacitance value C=10·F, and
coefficients $a_1$, $b_0$, $b_1$, $b_2$ and k which are used by the multipliers 51b, 53a, 53b, 53c and 57 shown in FIG. 8 are the following values from the equation (7),
k=5,
$b_0$=25,
$b_1$=2,
$b_2$=−24, and
$a_1$=−0.5.

Here, if attention is paid on the frequency-phase characteristic in FIG. 12, the phase is delayed in a range from 1 KHz to 20 kHz, but the phase progresses to about 60 degrees in a range from 20 kHz to 50 kHz. The phase is rapidly delayed when the frequency exceeds 50 kHz. Comparing FIG. 12 and FIG. 11, the operation tendency of the switching regulator according to the present embodiment is the same as the operation tendency of the analog control switching regulator which executes the current mode control based on the actually detected inductor current. Therefore, in the switching regulator according to the present embodiment, it could be understood that the controller 18 which is the digital circuit realizes the current mode control of the switching regulator without actually detecting the inductor current.

According to the present embodiment, the current mode control of the switching regulator is realized by using the controller 18 as the digital circuit. Therefore, the switching regulator according to the present embodiment can reduce a process cost, as compared with the analog control switching regulator.

It should be noted that when values of power-of-two are used as the coefficients for the multiplication of the digital filter circuit (e.g. $a_1$, $b_0$, $b_1$, and $b_2$), an arithmetic shift calculation unit which executes a multiplication by shifting bit data into a right or left direction can be used as the multiplier of the current mode control circuit 17. Or, the current mode control circuit 17 may execute the multiplication by using a look-up table in which input data and multiplication data of the input data by a coefficient are related to each other and stored. For example, the look-up table is possible to be realized by using a ROM (READ Only Memory). When the current mode control circuit 17 adopts these methods of multiplying calculation, degree of freedom of the calculation is limited because the coefficients of the multiplication are fixed, but the circuit configuration of the current mode control circuit 17 becomes simple, compared with a case to use a multiplier. Therefore, the circuit scale of the controller 18 and the consumption current can be restrained.

Generally, in the multiplier, the calculation delay increases rapidly when the number of bits of the input data increases. On the other hand, the arithmetic unit of the arithmetic shift calculation and the look-up table can execute calculation in short time irrespective of the number of bits of the input data. By adopting the arithmetic unit of the arithmetic shift calculation and the look-up table, the increase of the circuit scale and the increase of consumption current can be restrained, and the switching regulator can be easily operated even if the switching frequency is high.

In the present embodiment, since the controller 18 as the digital arithmetic and logic unit which estimates the inductor current and executes the current mode control of the switching regulator, operates with the master clock of the same frequency as the switching frequency, the increase of the consumed power and the reducing of power supply conversion efficiency in the switching regulator are restrained.

The reason that the controller 18 can be operated with the master clock of the same frequency as the switching frequency will be described below.

The controller 18 estimates the inductor current by using the intermediate voltage of the high-voltage side resistance 9 and the low-voltage side resistance 10, as the analog control signal in a frequency band sufficiently low than the switching frequency. Generally, for the purpose that the switching regulator operates stably regardless of the configuration of the analog circuit or the digital circuit, it is empirically known that a circuit constant should be set such that the frequency band of the control signal of the switching regulator is equal to or less than 1/10 of the switching frequency.

Also, since the current mode control circuit 17 is configured from the digital circuit, the inductor current which is estimated by the current mode control circuit 17 is limited to a frequency band equal to or less than ½ of the frequency of the master clock according to the sampling theorem. The frequency band of the intermediate voltage between the high-voltage side resistance 9 and the low-voltage side resistance 10 which is inputted to the A/D converter 11 of the controller 18 is equal to or less than 1/10 of the switching frequency. Therefore, the frequency band of the inductor current estimated by the current mode control circuit 17 is equal to or less than 1/10 of the switching frequency. Therefore, if the frequency of the master clock of the current mode control circuit 17 is equal to or more than 1/5 of the switching frequency, the current mode control circuit 17 can realize the operation based on the sampling theorem. That is, the frequency of the master clock of the current mode control circuit 17 may be the same as the switching frequency. Moreover, by equalizing the frequency of the master clock of the current mode control circuit 17 as the digital arithmetic and logic unit to be the same as the switching frequency and simplifying calculation processing, a toggle operation rate of the internal logic of the current mode control circuit 17 is reduced. As a result, the consumption current of the current mode control circuit 17 is restrained.

Referring to FIG. 12, the unity gain frequency in which a closed-loop gain is 0 dB is 141.3 kHz. Therefore, the unity gain frequency is equal to or less than 1/10 of the frequency of the master clock which is set to 3 MHz which is the same as the switching frequency. Moreover, because the phase margin is 69.5 degrees, it could be understood that the switching regulator according to the present embodiment has a phase margin which is enough to perform a stable operation.

[Second Embodiment]

Figure 13:
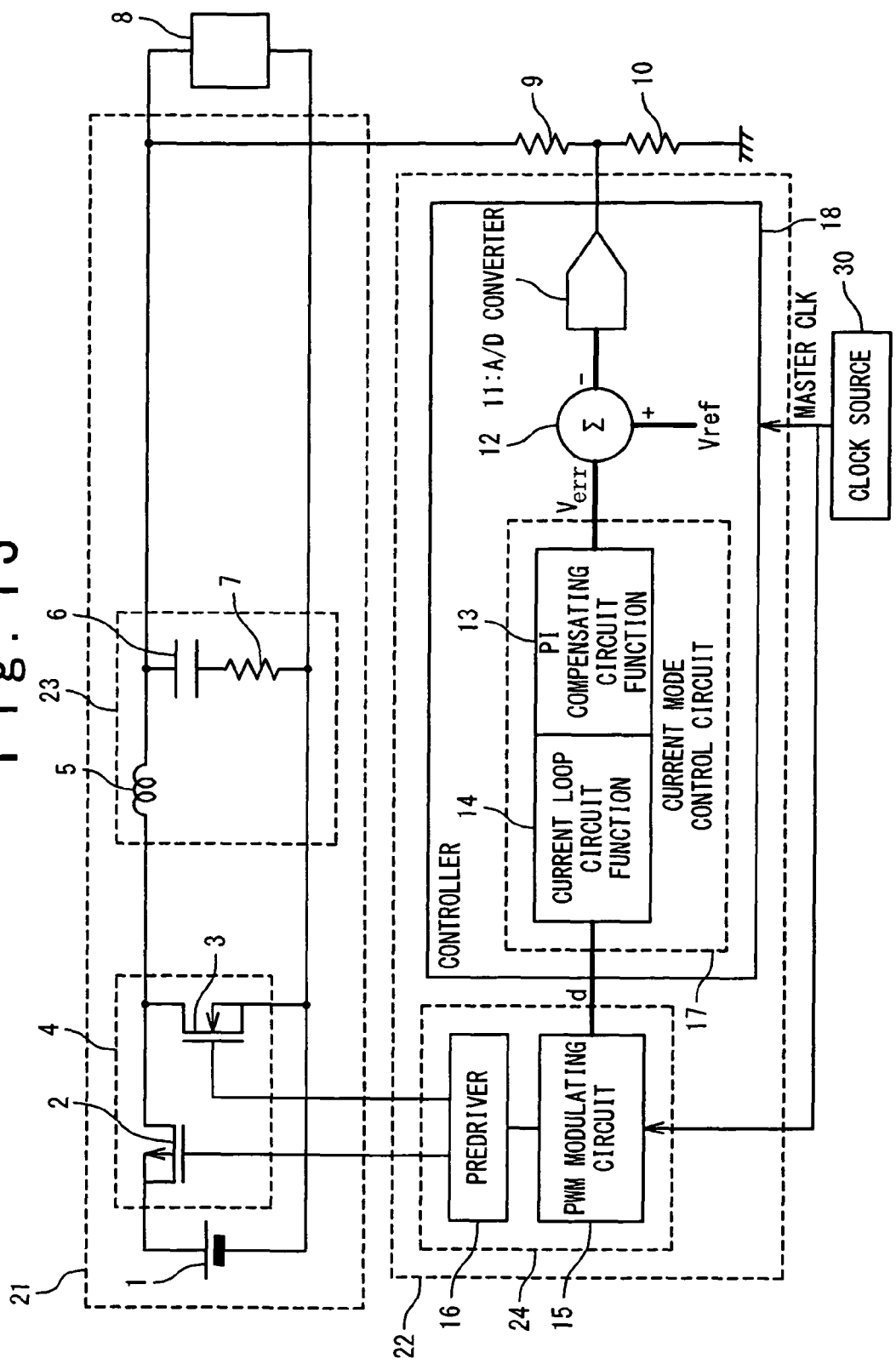
FIG. 13 is a circuit block diagram of a digital current mode control switching regulator according to a second embodiment of the present invention.

Referring to FIG. 13, the switching regulator according to a second embodiment of the present invention will be described. The switching regulator according to the present embodiment is the same as the switching regulator according to the first embodiment except for the following points.

In the switching regulator according to the present embodiment, a clock source 30 is added. For example, the clock source 30 is a ring oscillator. The clock source 30 generates the master clock of the same frequency as the switching frequency of the switching circuit 4 and supplies it to the controller 18 and the switching pulse generating section 24. The controller 18 operates with the master clock as mentioned above. The switching pulse generating section 24 operates with the master clock.

It should be noted that the integrated circuit device for the switching regulator according to the present embodiment is provided with the switching pulse control section 22 and the clock source 30. The integrated circuit device for the switching regulator may include the high-voltage side resistance 9 and the low-voltage side resistance 10, and may further include the switching circuit 4.

According to the present embodiment, since the controller 18 and the switching pulse generating section 24 operate with the common master clock, the circuit configuration of the integrated circuit device for the switching regulator can be made simple. Moreover, according to the present embodiment, since the clock source 30 can be formed from the ring oscillator, it is possible to make the circuit scale of the clock source 30 small. For example, the clock source 30 can be integrated with the switching pulse control section 22 as one semiconductor IC. This is based on that the master clock can be generated by the ring oscillator because the frequency of the master clock is lowered to the same frequency as the switching frequency. In the technique of Patent Literature 1, because the master clock is required to have the frequency of hundreds of times of the switching frequency, the master clock generation circuit becomes large in scale. However, according to the present embodiment, because the master clock can be generated by the ring oscillator, the circuit scale of the clock source 30 can be made small.

[Third Embodiment]

Figure 14:
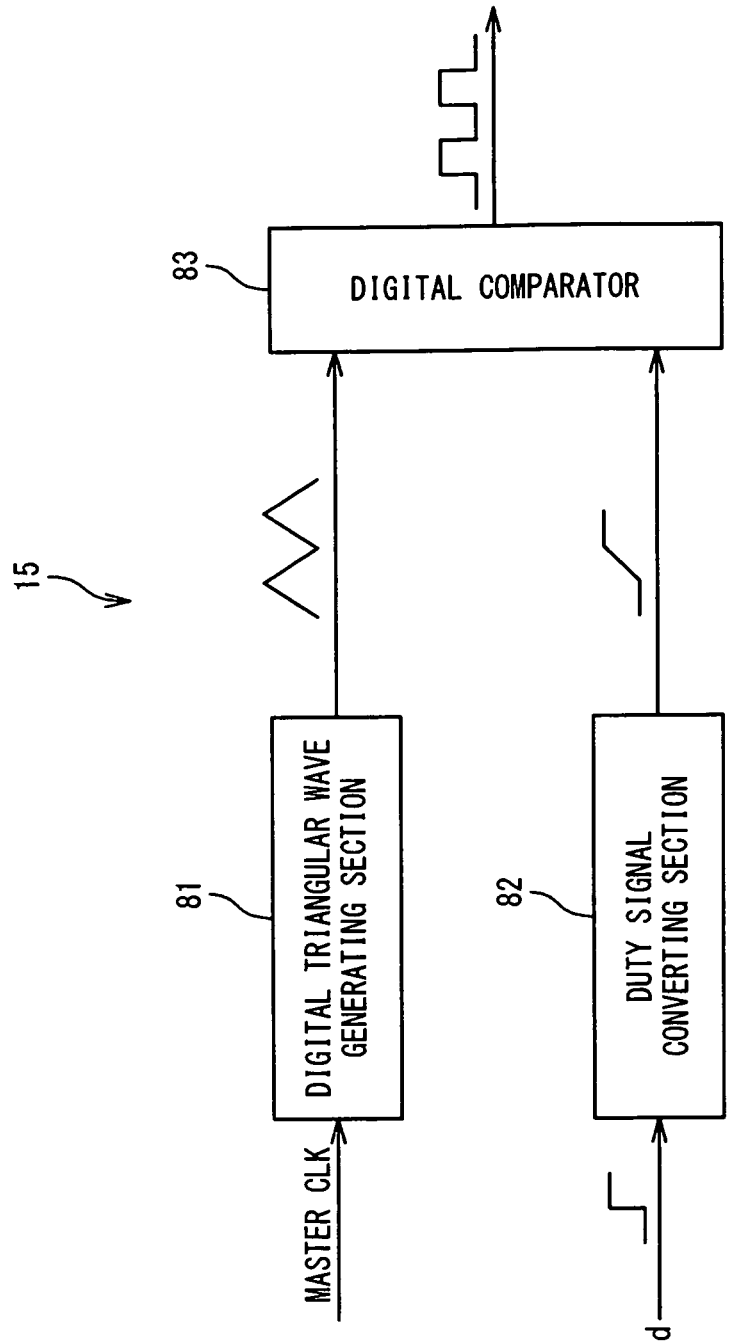
FIG. 14 is a block diagram showing the configuration of a PWM modulating circuit according to a third embodiment.

Referring to FIG. 14, the switching regulator according to the third embodiment of the present invention will be described. The switching regulator according to the present embodiment is the same as the switching regulator in the second embodiment except for the following points.

The PWM modulating circuit 15 in the present embodiment is provided with a digital triangle wave generating section 81, a duty signal converting section 82 and a digital comparator 83. The digital triangle wave generating section 81 outputs a digital triangle wave signal which is synchronized with the master clock. The digital comparator 83 outputs the PWM signal to the predriver 16. In the present embodiment, the digital duty signal d specifies a time ratio of the switching pulse signal indirectly without specifying it directly. That is, the digital duty signal d is a threshold signal to be compared with the digital triangle wave signal. The duty signal converting section 82 converts the digital duty signal d such that a time change rate of the digital duty signal d is equal to or less than the time change rate of the digital triangle wave signal. The digital comparator 83 sets the time ratio of the PWM signal based on the comparison result of the digital triangle wave signal and the digital duty signal d after the conversion. Therefore, the time ratio of the switching pulse signal outputted from the predriver 16 is set based on the digital triangle wave signal and the digital duty signal d after the transformation.

According to the present embodiment, because the time change rate of the digital duty signal d after the transformation is equal to or less than the time change rate of the digital triangle wave signal, the frequency of the PWM signal and the frequency of the switching pulse signal which is based on the PWM signal become constant surely. It should be noted that the explanation that the PWM signal frequency is constant is disclosed in JP 2001-111396A.

It should be noted that the duty signal transforming section 82 may be not provided and the digital comparator 83 may set the time ratio of the PWM signal based on the digital triangle wave signal and the digital duty signal d.

[Fourth Embodiment]

Hereinafter, the switching regulator according to the fourth embodiment of the present invention will be described.

In the above-mentioned first to third embodiments, of the equation (6) showing the transfer function of the current mode control circuit 17, the items which are related with the characteristic of the PI compensation circuit function 13 are separated to a numerator and the items which are related with the characteristic of the current loop circuit function 14 separated to a denominator. The PI compensation circuit function 13 determines the phase margin of the switching regulator according to the first to third embodiments, that is, the oscillation stability of the power supply. Also, the current loop circuit function 14 determines a loop gain of the switching regulator, i.e. the output voltage precision and the load change stability of the power supply. Therefore, the oscillation stability of the power supply, as well as the output voltage precision and the load change stability of the power supply can be set independently.

Referring to FIG. 15, the switching regulator according to the fourth embodiment will be described. The switching regulator according to the present embodiment is the same as the switching regulator according to the first to third embodiments except for the following points.

In the switching regulator according to the present embodiment, a register 60, a register 61 and a digital interface 62 are added. The registers 60 and 61 are installed in advance. The coefficients $a_1$ and $a_2$ of the digital filter circuit as the current mode control circuit 17 are sets in the register 60. The coefficients $b_0$, $b_1$ and $b_2$ of the digital filter circuit as the current mode control circuit 17 are sets in the register 61. The digital interface 62 writes the data of the coefficients $a_1$ and $a_2$ in the register 60 and writes the data of the coefficients $b_0$, $b_1$ and $b_2$ in the register 61.

The integrated circuit device for the switching regulator according to the present embodiment contains the switching pulse control section 22, the register 60, the register 61 and the digital interface 62 at least.

The register 60 retains data of the coefficients $a_1$ and $a_2$ which are related with the current loop circuit function 14, and the register 61 retains data of the coefficients $b_0$, $b_1$ and b2 which are related with the PI compensation circuit function 13. Thus, the circuit constants of the current mode control circuit 17 can be set.

Moreover, the data in the registers 60 and 61 can be rewritten through the digital interface 62 from outside of the integrated circuit device for the switching regulator. Therefore, the optimum values of the circuit constants of the current mode control circuit 17 can be simply set from outside of the integrated circuit device for the switching regulator, in a condition that the integrated circuit device for the switching regulator is mounted on the circuit board, according to the circuit condition of the set mounted with the integrated circuit device for the switching regulator.

According to the present embodiment, for example, the switching pulse control section 22 which contains the controller 18 and the switching pulse generating section 24 can be integrated in one semiconductor IC. Also, the switching pulse control section 22 and the switching circuit 4 can be integrated in one semiconductor IC. Also, the controller 18, the switching pulse generating section 24 and the switching circuit 4 may be formed as independent semiconductor ICs. Moreover, the clock source 30 and the switching pulse control section 22 may be integrated into one semiconductor IC.

As described above, a switching regulator, an integrated circuit device for the switching regulator, and a method of designing an integrated circuit device for the switching regulator according to the present invention have been described with reference to the embodiments. However, the present invention is not limited to the above-mentioned embodiments, and various modifications would be possible to a skilled person in the art in a scope of the present invention. For example, in the above embodiments, a voltage reducing-type switching regulator has been described. However, the switching regulator according to the present invention may be of a voltage boosting type, a voltage-increasing and -reducing type or a polarity inverting type.

What is claimed is:

1. An integrated circuit device for a switching regulator, comprising:
    a controller configured to generate a digital duty signal for a current mode control of said switching regulator based on an output voltage to be supplied from said switching regulator to a load circuit; and
    a switching pulse generating section configured to set a time ratio of a switching pulse signal for controlling turning-on and turning-off of a switching circuit which is provided in said switching regulator, based on said digital duty signal,
    wherein said controller is a digital circuit which operates based on a master clock of the same frequency as a switching frequency of said switching circuit.

2. The integrated circuit device according to claim 1, further comprising:
    a clock source configured to generate said master clock to supply to said controller and said switching pulse generating section,
    wherein said switching pulse generating section operates based on said master clock.

3. The integrated circuit device according to claim 2, wherein said switching pulse generating section sets the time ratio of said switching pulse signal based on said digital duty signal and a digital triangle wave signal.

4. The integrated circuit device according to claim 1, wherein said controller comprises:

an analog-to-digital (A/D) converter configured to generate a digital voltage signal corresponding to said output voltage;
    a difference circuit configured to generate a digital error signal from said digital voltage signal and a digital reference voltage signal; and
    a current mode control circuit configured to generate said digital duty signal based on said digital error signal, and
    wherein said current mode control circuit comprises an IIR digital filter circuit.

5. The integrated circuit device according to claim 4, wherein said IIR digital filter circuit comprises:
    a first adder configured to output an addition result of an adder output and said digital error signal;
    a first multiplier configured to output a multiplication result of a first coefficient and the output of said first adder;
    a first delaying circuit configured to output a delay result of the output of said first multiplier for one clock;
    a second delaying circuit configured to output a delay result of the output of said first delaying circuit for one clock;
    a second multiplier configured to output a multiplication result of a second the coefficient and the output of said first delaying circuit;
    a third multiplier configured to output a multiplication result of a third the coefficient of the output of said second delaying circuit;
    a second adder configured to output an addition result of the output of said second multiplier and the output of said third multiplier as said adder output;
    a fourth multiplier configured to output a multiplication result of a fourth coefficient and the output of said first multiplier;
    a fifth multiplier configured to output a multiplication result of a fifth coefficient and the output of said first delaying circuit;
    a sixth multiplier configured to output a multiplication result of a sixth coefficient and the output of said second delaying circuit;
    a third adder configured to output an addition result of the output of said fifth multiplier and the output of said sixth multiplier;
    a fourth adder configured to output an addition result of the output of said fourth multiplier and the output of said third adder; and
    a seventh multiplier configured to multiply a seventh coefficient by to output of said fourth adder and to generate said digital duty signal.

6. The integrated circuit device according to claim 4, wherein said IIR digital filter circuit comprises:
    a subtractor configured to output a subtraction result of a multiplier output from said digital error signal;
    a first delaying circuit configured to output a delay result of an output of a first multiplier for one clock;
    a second delaying circuit configured to output a delay result of the output of said first delaying circuit for one clock;
    a first multiplier configured to output a multiplication result of a first coefficient and the output of said first delaying circuit as said multiplier output;
    a second multiplier configured to output a multiplication result of a second coefficient and the output of said subtractor;
    a third multiplier configured to output a multiplication result of a third coefficient and the output of said first delaying circuit;

a fourth multiplier configured to output a multiplication result of a fourth coefficient and the output of said second delaying circuit;

a first adder configured to output an addition result of the output of said third multiplier and the output of said fourth multiplier;

a second adder configured to output an addition result of the output of said second multiplier and the output of said first adder; and a fifth multiplier to multiply a fifth coefficient and the output of said second adder to generate said digital duty signal.

7. A designing method of an integrated circuit device for a switching regulator, comprising:

modeling an analog control switching regulator to determine a plurality of analog transfer functions;

determining a plurality of digital transfer functions through bilinear transformation from said plurality of analog transfer functions;

determining one from said plurality of digital transfer functions; and designing a controller provided for the integrated circuit for a digital control switching regulator based on the determined digital transfer function, wherein said integrated circuit further comprises a switching pulse generating section, wherein said controller generates a digital duty signal for a current mode control of said digital control switching regulator based on an output voltage to be supplied from said digital control switching regulator to a load circuit, wherein said switching pulse generating section sets a time ratio of a switching pulse signal for controlling turning-on and turning-off of a switching circuit which is provided in said digital control switching regulator, based on said digital duty signal, and wherein said controller is a digital circuit which operates based on a master clock of the same frequency as a switching frequency of said switching circuit.

8. The designing method according to claim 7, wherein said plurality of analog transfer functions comprises a transfer function corresponding to a current loop of said analog control switching regulator.

* * * * *